May 12, 1970    W. H. KING ET AL    3,510,967
APPARATUS FOR READING BRAILLE
Filed Sept. 9, 1968    4 Sheets-Sheet 1

INVENTORS
WILLIAM H. KING
KEITH L. WALLACE
ROBERT A. BRUCE
BY
*Haven E. Simmons*

ATTORNEY

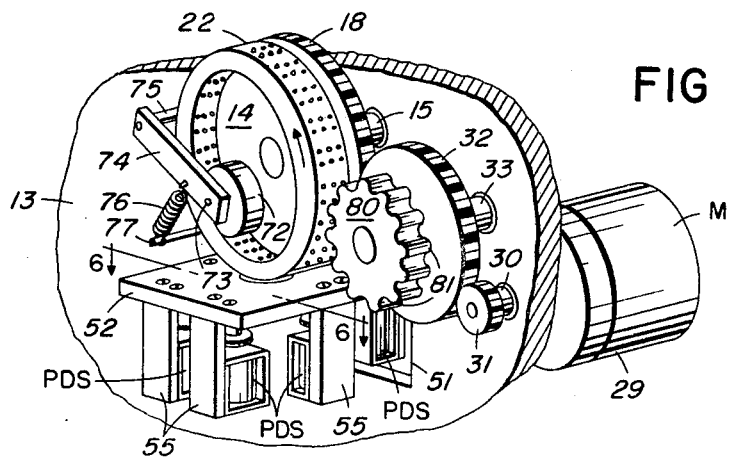
FIG 5
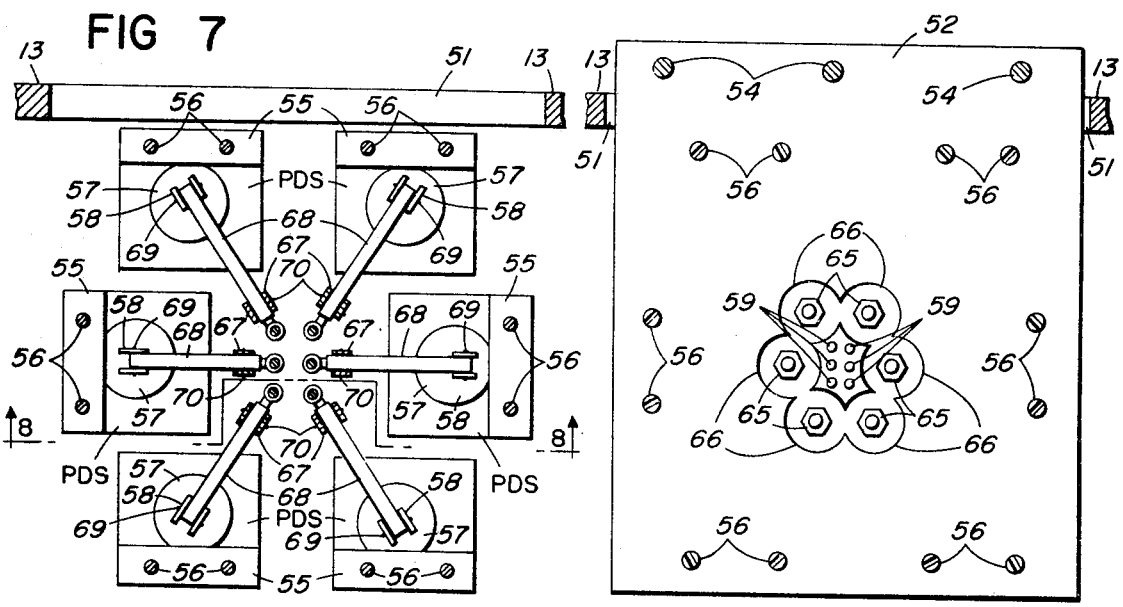
FIG 7
FIG 6
FIG 8
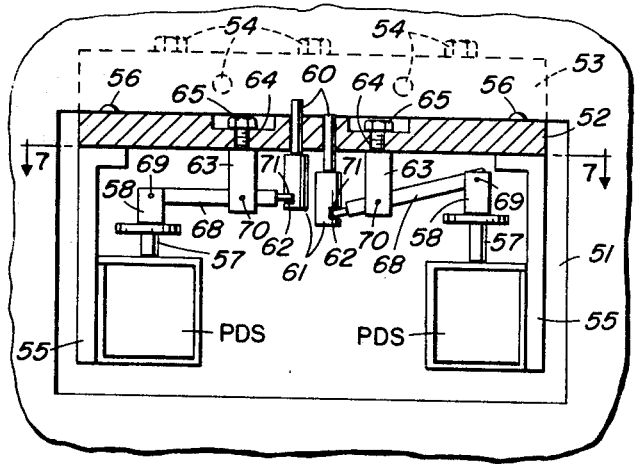
INVENTORS
WILLIAM H. KING
KEITH L. WALLACE
ROBERT A. BRUCE
ATTORNEY

INVENTORS
WILLIAM H. KING
KEITH L. WALLACE
ROBERT A. BRUCE
BY
ATTORNEY

United States Patent Office 3,510,967
Patented May 12, 1970

3,510,967
APPARATUS FOR READING BRAILLE
William H. King, Keith L. Wallace, and Robert A. Bruce, Marion, Iowa, assignors, by mesne assignments, to Mildred P. Gates
Filed Sept. 9, 1968, Ser. No. 758,460
Int. Cl. G09b 21/00
U.S. Cl. 35—35                                10 Claims

ABSTRACT OF THE DISCLOSURE

A Braille reader using an incremental tape recorder input with magnetic tape bearing Braille characters or cells encoded thereon. The particularly novel feature of the reader is a shallow, rotating drum whose periphery carries sets of radially movable pins spaced thereabout, each set consisting of six such pins arranged in a standard Braille cell pattern. A cluster of six pin-drive solenoids, responsive to the output of the recorder, moves the appropriate pin or pins in each set as the drum rotates to reproduce the Braille cell signalled by the recorder. A succession of Braille cells are thus produced on the drum and are carried around up beneath the fingers of the reader thereupon. After the cells have been sensed, the pin sets are successively cancelled before being again subjected to the pin-drive solenoids. Appropriate control circuits are provided by which to synchronize the respective operations of the recorder, the pin-drive solenoids and the drum.

BACKGROUND OF THE INVENTION

Conventionally, Braille text is usually embossed in heavy sheets of paper, which, especially when bound in book form, are large, heavy and cumbersome. To produce a Braille version of a typical magazine, for instance, results in a volume or volumes many times the bulk of the original. Furthermore, the process of translating into Braille in this manner is slow and costly. Many efforts have been made to reduce the bulk of Braille texts and the time and expense involved in its manufacture. In some instances, the Braille characters, or cells as they are called in the art, have been punched into paper tapes (see Pats. Nos. 2,521,338, 2,549,632 and 2,924,896) or sheets (see aPts. Nos. 1,178,991 and 2,891,324) or encoded on magnetic tape (see Pats. Nos. 3,230,644 and 3,289,327). Various types of readers have been devised for use with the foregoing tapes or sheets, but none of these readers or reader-tape combinations has proven very acceptable for several reasons.

First, in the case of paper tapes and sheets, their sheer bulk is a drawback; it simply requires too much tape or paper for the typical magazine or book, just as in the case of conventional Braille books. Second, the readers themselves have tended to be too slow or unreliable in operation or too complicated in structure. All these deficiencies are present in the various apparatus shown and described in the patents just referred to. For example, the readers of Pats. Nos. 2,549,632, 2,924,896 and 3,230,644 are of the "single cell" type whereby but one Braille cell is formed at a time to be sensed by the reader's fingers. This is most undesirable because it does not reproduce the feeling acquired by the reader's fingers moving over a line of Braille cells as when reading a Braille book. Experienced Braille readers tend to read several cells at a time and this is obviously impossible with the single cell type of reader. The readers of Pats. Nos. 1,178,991 and 2,891,324, employing rolled sheets of paper, provide successive lines of Braille cells, but they are wholly mechanical in operation, employing sets of pins which directly engage appropriate perforations in the paper. They are for these reasons both unreliable as well as too slow in operation; furthermore, the paper sheets must be manually advanced to proceed from one line of cells to the next. The reader of Pat. No. 3,289,327 employs magnetic tape and, in one embodiment, a series of cells, each with its own electro-mechanical operation. However, owing to the unavoidable bulk of each cell, the several cells must be necessarily spaced apart a greater distance than the customary ¼" of normal Braille. Furthermore, the reader of this patent is incorporated with other apparatus and is intended primarily for instruction in Braille reading. The reader of Pat. No. 2,521,338 employs an endless traveling belt carrying sets of movable pins embedded therein arranged in Braille cells. A paper tape input bearing Braille cells punched therein is mechanically sensed and a trio of solenoids responsive to the cells so sensed controls the pins in the belt to form the cells on the belt, the latter then carrying the cells beneath the fingers of the reader. Not only is that reader very complex in construction, beside using a paper tape input, but the endless belt requires special materials and manufacturing techniques. Indeed, a separate patent was obtained on its fabrication alone, No. 2,551,094.

Accordingly, the chief object of the present invention is an improved Braille reader which eliminates the various difficulties and deficiencies of those of the prior art referred to.

SUMMARY OF THE INVENTION

At the heart of the Braille reader of the present invention is a shallow metal drum rotating on a horizontal axis and carrying on its periphery a total of 36 sets of metal pins, each set consisting of six pins arranged in a Braille cell. The pins pass through the cylindrical wall of the drum and are radially movable with respect thereto, their length being such that they may protrude from or lie flush with the drum's periphery depending upon in which direction they are moved. The pins are retained in either of their two positions by an annular elastomeric insert, through which the pins also pass, disposed in an axially extending, concentric groove in the cylindrical wall of the drum, the insert frictionally gripping the pins. The pins are actuated by a stationary cluster of pin-drive solenoids and associated linkage disposed beneath and closely adjacent the drum's periphery. As the drum rotates, the sets of pins pass successively over the pin-drive solenoids and their associated linkage, and those pins in each set not required for the particular Braille cell to be formed are driven radially inwardly of the drum so that they lie flush with its periphery. The successive Braille cells thus formed are carried by rotation of the drum to the exposed top of the drum's periphery, whence they pass beneath and are read by the fingertips of the reader. After being read, the cells pass downwardly past a cancelling roller mounted within the drum which pushes outwardly those pins of each set previously driven inwardly before each set again arrives above the pin-drive solenoids to receive another cell. Despite widespread doubt as to whether it would be possible or feasible to read Braille from the curved surface of a drum, either when stationary or particularly when in motion, instead of from a flat surface as is customary, no reader has found any difficulty in doing so, even at his usual speeds. Indeed, it has been found that a drum of only 2.8" or so diameter is sufficient for the purposes. Not only can the prescribed ¼" spacing between the cells be maintained but the latter also can be of customary size and feel and yet permit the sensing of the three to five cells at a time necessary for speed reading. The result is a most compact and relatively simple reading device.

The input to the reader is in the form of impulses from a magnetic tape recorder upon whose tape Braille cells have been previously encoded by means of a suitable keyboard encoder. In order to reduce the quantity of tape required, the keyboard encoder and the recorder are of the incremental type, that is to say, the tape advances only when a cell is encoded therein or read out, as the case may be, rather than continuously running. The recorder includes a set of six relays whose solenoids are responsive to each Braille cell encoded on the tape, the contacts of each relay being in series with one of the six pin-drive solenoids beneath the drum. The number of recorder relays closed at any one time depends upon the particular Braille cell being reproduced. The drum is driven by an appropriate electric motor whose speed may be varied such that anywhere from 0 to 12 Braille cells per second may be read from the drum. A timing wheel, also driven by the motor through a suitable gear train, carries a series of cogs on its periphery which open and close a pair of staggered, series connected microswitches in a control circuit which synchronizes the operation of the recorder, the drum and the pin-drive solenoids. The control circuit includes a control relay having alternate contacts which is activated only when both microswitches are closed. When that happens, the Braille cell having previously been extracted from the tape and applied to the solenoids of the appropriate recorder relays is transmitted by a read-out circuit through the closed contacts of the latter and one of the alternate control relay contacts to the corresponding pin-drive solenoids. Upon the opening of one or both of the microswitches, as the timing wheel continues to advance, the control relay is deactivated and accordingly the read-out circuit through the recorder relay contacts to the respective pin-drive solenoids is opened, whereupon the other alternate control relay contact establishes an input circuit by which the magnetic tape is advanced and the next Braille cell is applied to the appropriate solenoids of the recorder relays. Upon the next closing of both microswitches, the reactivation of the control relay opens the input circuit, halting the tape, and again closes the read-out circuit to begin a new cycle. The two staggered microswitches provide the proper time intervals in which to complete the respective operations performed by the read-out and input circuits.

Other advantages and features of the invention will be apparent from the more detailed description thereof which follows:

BRIEF DESCRIPTION OF THE DRAWINGS

FIG. 5 is a partial isometric view, certain components being omitted, illustrating the arrangement of the Braille pin drum, pin-drive solenoids, drive motor, gear train and timing wheel.

FIG. 6 is a view taken along the line 6—6 of FIG. 5.

FIG. 7 is a plan view taken along the line 7—7 of FIG. 8.

FIG. 8 is a plan view taken along the line 8—8 of FIG. 7.

DESCRIPTION OF THE PREFERRED EMBODIMENT

Figure 1:
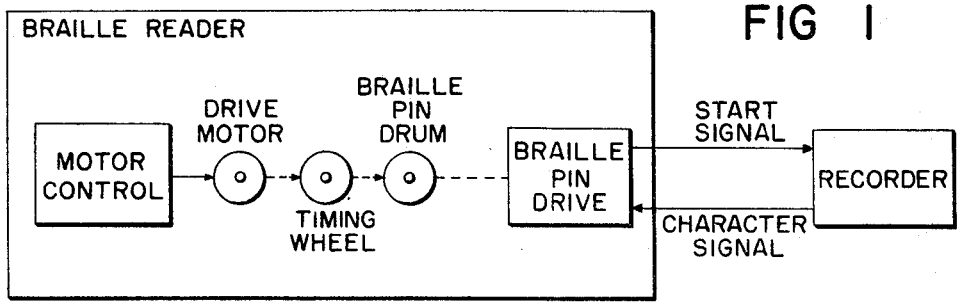
FIG. 1 is a block diagram illustrating the basic relationships of the components of the Braille reader of the present invention and the incremental tape recorder.
Figure 2:
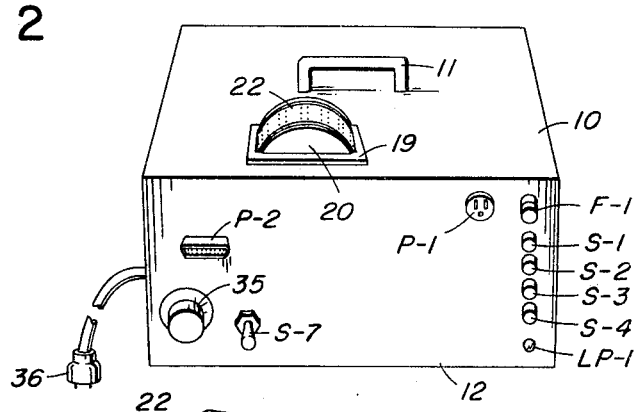
FIG. 2 is a front isometric view of the Braille reader in its housing.

The Braille reader is enclosed within a rectangular housing 10 of metal or other suitable material provided with a convenient carrying handle 11 and removable front and rear covers, the inner face of the front cover 12 carrying many of the electrical components and their wiring. The housing 10 is divided into front and rear compartments by an upright mounting plate 13 disposed centrally between its sidewalls upon which are carried the chief mechanical components of the reader. The most important of those is, as mentioned, the Braille pin drum, generally indicated at 14, which is disposed forward of plate 13 and journaled on a horizontal stub axle 15 adjacent the upper edge of the plate 13, somewhat to the left as viewed in FIG. 3, so that approximately the upper ⅓ of the drum 14 protrudes through an aperture in the top wall of the housing 10. The drum 14 is relatively shallow with a rear end wall 16 carrying a hub 17 to which is fixed a drive gear 18 sandwiched between the drum end wall 16 and the plate 13. A cover plate 19 having a front shield 20 and a dished rear shield 21 upright thereon, both generally congruent with the exposed front face of drum 14 and the outer and rear faces of drive gear 18, respectively, hides all but the outer drum surface 22 above the top wall of housing 10.

Figure 4:
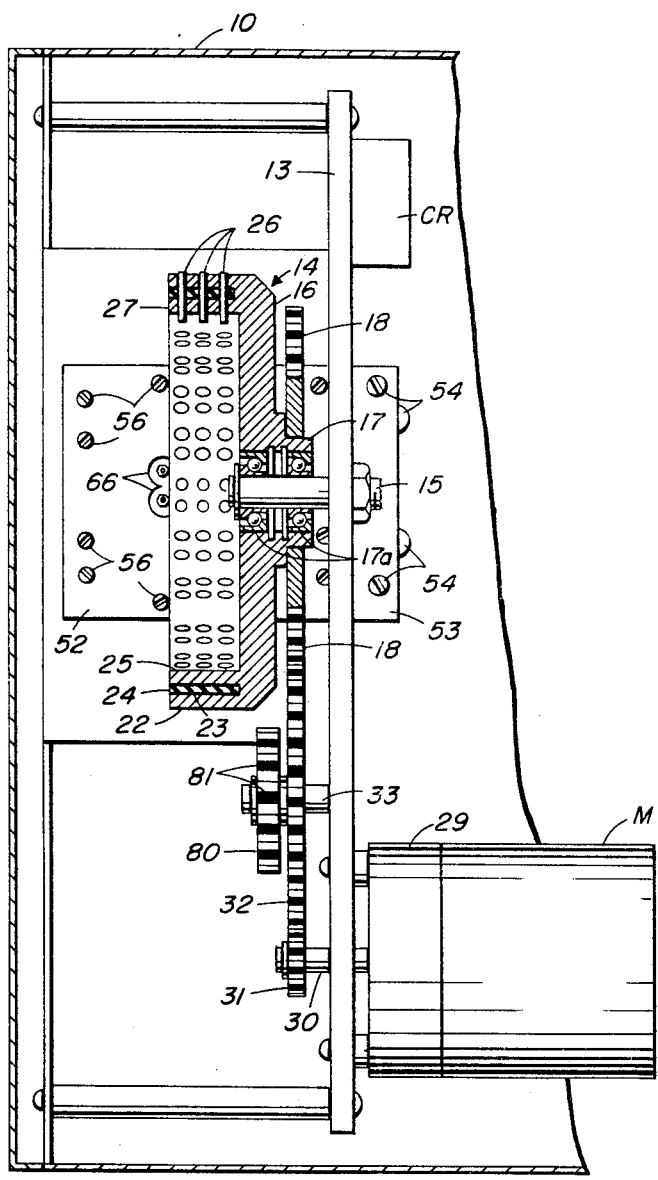
FIG. 4 is an enlarged, partial section taken along the line 4—4 of FIG. 3, certain components being omitted and some broken away, illustrating the structure of the Braille pin drum in particular.

The front end of drum 14 is open, its peripheral wall being provided with an axially extending, concentric groove 23 therein which receives an elastomeric insert 24 centrally disposed between the outer and inner drum surfaces 22 and 25, respectively. The periphery of drum 14 is fitted with a total of 36 sets of Braille read pins 26, each set consisting of six such pins arranged in the standard Braille cell pattern, as illustrated in FIG. 4, the spacing between the axes of symmetry of adjacent sets being ¼". The pins 26 are slidably received in drillings radially through the peripheral drum wall 27 and the insert 24, the latter frictionally gripping the pins 26 so that force is required to move them in either radial direction. The length of the pins 26 relative to the thickness of the drum wall 27 is such that when flush with the inner drum surface 25, the pins 26 protrude from the outer drum surface 22 an extent similar to the protrusion of Braille cells embossed upon paper sheets, the outer ends of the pins 26 being radiused to reproduce the feel of embossed Braille. A satisfactory working example of drum 14 may be machined from suitable aluminum stock, with the diameter of its outer surface 22 2.865", the thickness of its wall 27 .198", the axial length or depth of its inner surface 25 .344" and the thickness of the groove 23 .0632". The elastomeric insert 24 is preferably a rather hard neoprene rubber. Each read pin 26 may be formed from a suitable stainless steel and is .225" long and .0625" in diameter. The foregoing dimensions effectively reproduce the spacing and feel of conventionally embossed Braille cells.

Figure 3:
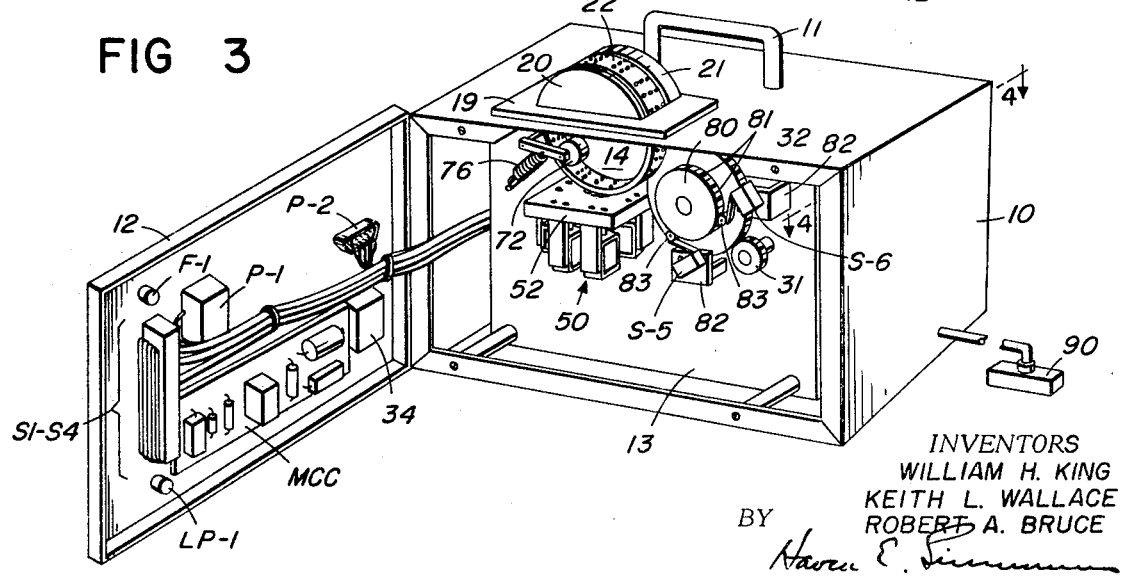
FIG. 3 is an isometric front view of the reader with the housing front panel swung open to disclose the general arrangement of its interior components.

Drum 14 is rotated by a drive motor M, which may be any type of relatively small electric motor operating from ordinary 115 volt, 60 cycle household current, appropriately horizontally mounted on the rear face of the plate 13 to the right of drum 14 as viewed in FIGS. 3–5. The motor M incorporates an integral reduction gearbox 28 whose output shaft 30 extends through the plate 13 and is fitted with a drive pinion 31 which meshes in turn with a large idler gear 32 journaled on a horizontal stub axle 33 extending from the front face of plate 13, the idler gear 32 in turn meshing with the drive gear 18 fixed to the drum 14. The drive train is so sized that the speed of drum rotation may be varied from 0 to 20 revolutions per minute, an appropriate motor control circuit MCC of any conventional type, incorporating a dynamic brake, a speed control and a reversing switch, being included for this purpose. The speed control 34 and its hand knob 35 for motor M are conveniently mounted upon the front housing cover 12 together with a power line fuse F–1, a power line switch S–1, a motor control switch S–2, a motor reversing switch S–3, a motor brake switch S–4 and an indicator lamp LP–1 in the power line circuit. A plug and power line cord 36 connect the reader into an appropriate power source and an outlet P–1, connected directly into the power line cord 36 upstream of S–1, is provided on the front panel 12 to supply the tape recorder.

The Braille pin drive mechanism, generally indicated at 50 in FIG. 3, is also carried by plate 13 below the drum 14. For this purpose the plate 13 is provided with a rectangular aperture 51 centrally below the axis of drum 14 which receives in turn the rear end of a plate 52 forming a platform projecting forwardly from plate 13 and centrally spaced just below the outer drum surface 22. The rear end of the plate 52 extends through the aperture 51 against its upper edge and is secured by means of a rectangular mounting block 53 fixed to and horizontally along the rear face of plate 13 and the upper face of the rear end of plate 52 by suitable screws 54 (see FIGS. 4 and 5–8). Below the lower face of plate 52 is a cluster of six pin-drive solenoids PDS1–6 arranged about plate 52 in an enlarged pattern similar to that of each set of read pins 26. Each solenoid PDS is supported within a depending C-shaped bracket 55 secured at its upper end by screws 56 to the underside of plate 52 and at its lower end to the bottom of its respective solenoid PDS, the exposed armatures 57 of the latter being uppermost and fitted with clevises 58. The central area of plate 52 between solenoids PDS is drilled through to provide actuator pin holes 59 in a pattern congruent and in alignment with that of each set of read pins 26 passing thereby as drum 14 rotates. A set of six actuator pins 60 are slidably mounted in their respective pin holes 59 in plate 52 and are provided with shouldered heads 61 below plate 52 having transverse slots 62 therein facing their respective solenoids PDS. Between the clevis 58 of each solenoid PDS and its respective actuator pin 60 an inverted rocker arm stand 63 is secured to the lower face of plate 52 by means of a screw thread 64 formed on an upper reduced portion of each stand 63 which passes through plate 52 and is secured thereto by a nut 65 in a counterbore 66 in the top face of plate 52. The lower end of each stand 63 is also provided with a clevis 67 aligned with the clevis 58 of its respective solenoid armature 57. Each clevis 57 receives the outer end of a rocker arm 68, pivoted thereto at 69 and to the clevis 67 of its respective rocker arm stand 63 at 70, the inner end of each rocker arm 68 being formed with a tongue 71 engaging the slot 62 of the respective actuator pin 60. The location of the fulcrums 70 relative to the ends of rocker arms 68 and the length of the actuator pins 60 are such relative to the travel of armatures 57 that upon actuation of solenoids PDS the actuator pins 60 will be elevated sufficiently to drive their respective read pins 26 in flush with the outer drum surface 22. In order to return each read pin 26 to its initial position, in which it protrudes from the outer drum surface 22, a cancelling roller 72 is provided which rides on the inner drum surface 25 and is journaled at 73 to the inner end of a transverse arm 74 extending past the open face of drum 14 to beyond the outer drum surface 22, the outer end of arm 74 being pivoted in turn on a stub axle 75 projecting from the front face of plate 13. The roller 72 is biased into engagement with the inner drum surface 25 by means of an extensible coil spring 76 secured at one end to the arm 74 and at the other to a pin 77, also projecting from the front face of plate 13.

Figure 9:
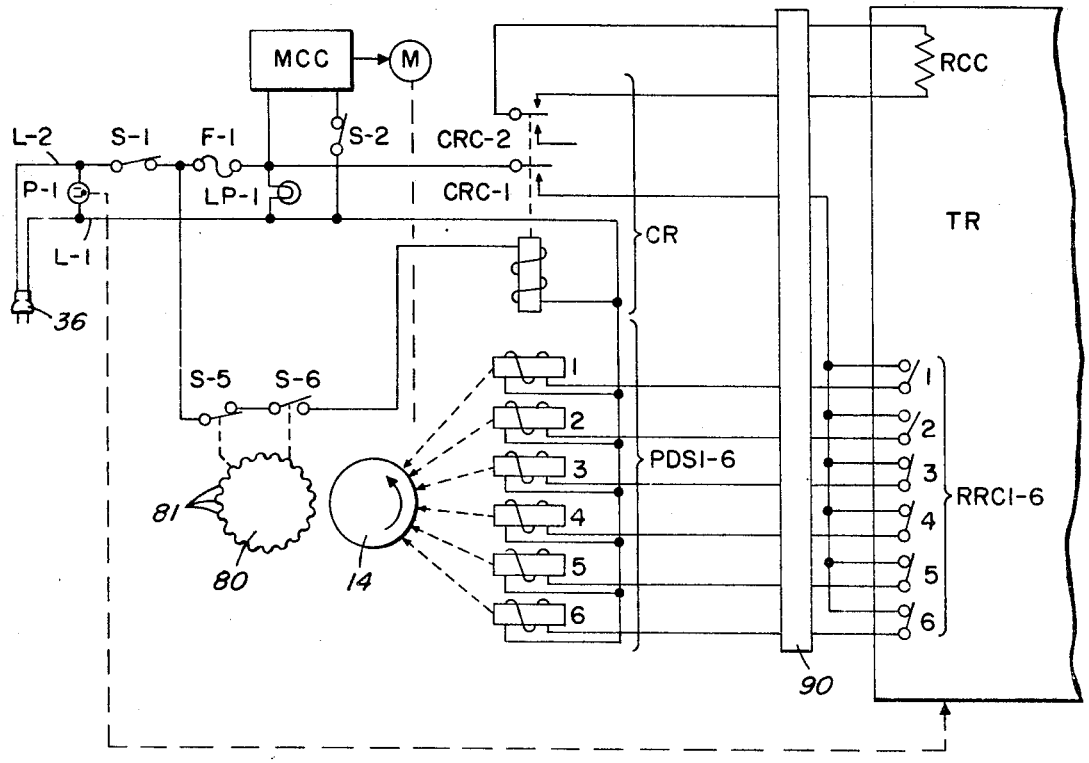
FIG. 9 is a schematic illustration of the circuitry controlling the operation of the recorder and the pin-drive solenoids.

As already noted, the input to the reader is from an incremental tape recorder, the tape itself having been encoded with Braille cells in any suitable manner known in the art. The tape recorder TC, diagrammatically indicated in FIGS. 1 and 9, employed with the foregoing example of the reader is a Kennedy model M201A manufactured by Kennedy Company, Pasadena, Calif. The output circuit of this recorder includes a series of individual relays, the contacts of six of which are shown in FIG. 9 as RRC1–6, one for each of the six components of a Braille cell. The recorder TC also includes a recorder input or control circuit, designated RCC in FIG. 9, by which the tape is advanced and halted and extraction of the Braille cell from the tape is governed. The operation of the pin drum 14, the pin-drive solenoids PDS1–6 and the tape recorder TC are coordinated by a reader control circuit now to be described.

A timing wheel 80, having a series of blunt cogs 81 formed on its periphery, is fixed concentrically to the front face of idler gear 32 and rotates therewith. A pair of normally open, s.p.s.t. microswitches S–5 and S–6 connected in series are mounted respectively below and to the right of timing wheel 80, as viewed in FIG. 3, upon suitable brackets 82 fixed to the front face of plate 13, their switch arms having roller ends 83 riding on the cogs 81 so as to open and close S–5 and S–6. The latter are also arranged with respect to the cogs 81 such that their respective openings and closings are staggered in order that the period during which one or both microswitches are open is substantially greater than that when both are closed, all for the purpose later to be described. Furthermore, the successive periods when both S–5 and S–6 are closed must coincide with the arrivals of successive sets of read pins 26 above the pin actuators 60 during rotation of drum 14. This requires a fixed relation between the peripheral speeds of drum 14 and timing wheel 80, which relation in turn also depends upon the number of closures of both S–5 and S–6 per revolution of timing wheel 80 and that in turn upon the size and spacing of the cogs 81. From the foregoing relations, the required diameter of timing wheel 80 for any size and spacing of cogs 81 can be readily calculated.

Referring now to the circuitry of FIG. 9, it will be noted that one side each of the motor control circuit MCC through S–2, the recorder power outlet P–1, the solenoid of a d.p.s.t. control relay CR mounted on the rear face of plate 13 (see FIG. 4) and the six pin-drive solenoids PDS1–6 is connected into one side L–1 of the power line cord 35; that the other side of the recorder power outlet P–1 is connected into the other side L–2 of the power line cord 35 upstream of the power switch S–1; that the other side of the solenoid of the control relay CR is connected through the series connected microswitches S–5 and S–6 into the side L–2 downstream of the power switch S–1; and that in parallel with the latter circuit the side L–2 downstream of S–1 is also connected to the other side of the motor control circuit MCC and the contact CRC–1 of CR, thence through the individual recorder relay contacts RRC1–6 to the other sides of the respective pin-drive solenoids PDS1–6. Lastly, the recorder control circuit RCC is connected through the other contact CRC–2 of the control relay CR. The nine control circuit interconnections between the reader and the recorder can be conveniently gathered into a single cable and plug 90 from the reader. The operation of the reader and recorder are therefore as follows:

When the power switch S–1 and the motor control switch S–2 are both closed, the recorder TC is plugged into P–1 and one (as shown) or both of S–5 and S–6 are open, CR is in its inactive position in which CRC–1 is open and CRC–2 is closed, thus activating the recorder control circuit RCC causing it to advance the tape and extract the next Braille cell which is then applied to the appropriate solenoids of the recorder's output relays, depending upon the particular cell concerned, thereby closing their respective relay contacts RRC1–6; as shown, RRC3–6 are closed while RRC1–2 are open. The reason that the period during which S–5 and S–6 are one or both open is substantially greater than that when they are both closed is in order to give sufficient time for the tape to advance and the cell to be extracted. Continued rotation of timing wheel 80 results in the closing of both S-5 and S-6 whereupon it will be seen that CR is activated, opening the contacts CRC-2 and the circuit RCC and thus halting the tape. At the same time the contact CRC-1 is closed, completing the circuit through the closed recorder relay contacts RRC3-6 to the respective pin-drive solenoids PDS3-6. At this moment, owing to the foregoing described coordination between the closing of S-5 and S-6 and the rotation of drum 14, a set of read pins 26 has arrived just above the actuator pins 60 the moment that the pin-drive solenoids PDS3-6 are energized, causing their respective rocker arms 68 to elevate the respective actuator pins 60 and drive the appropriate read pins 26 in flush with the outer drum surface 22. Further rotation of timing wheel 80 results again in the opening of one or both of S-5 and S-6, hence deactivating control relay CR and thus opening the circuit through contacts CRC-1 and RRC3-6 to the pin-drive solenoids PDS3-6, whereupon the corresponding actuator pins 60 are withdrawn. At the same time the recorder control circuit RCC is re-established through the closing of contacts CRC-2 and another cycle begins. Thus a succession of Braille cells is formed on the outer surface 22 of drum 14 and carried up above the top wall of housing 10 where they pass beneath the fingertips of the reader, thence passing downwardly to be successively cancelled by the roller 72 before again being subject to the actuator pins 60 to form a new cell. The motor speed control 34 permits anywhere from 0 to 12 Braille cells a second to be formed on the drum 14 and the ability to sense several of these at a time on the drum 14 permits speed reading. In order to allow remote or foot control of the speed of motor M, a plug P-2 is mounted on the front panel 12 into which a cable to the foot operated speed control, similar to the control 34, may be plugged. A switch S-7 on the panel 12 permits selection of one or the other.

Though the invention has been described in terms of a particular embodiment, being the best mode known of carrying it out, and detailed descriptive language has been used, it is not so limited. Instead the following claims are to be read as including all adaptations and modifications of invention falling within the spirit and scope thereof.

We claim:

1. In Braille reader apparatus the improvement comprising a Braille cell carrying member rotatable about an axis and having a wall portion concentric with said axis; a plurality of Braille cell groups carried by and peripherally spaced around said wall portion, each of said groups including a set of six Braille cell indicators disposed in Braille cell arrangement and independently settable relative to each other and said wall portion between positions thereon in which said indicators are either sensible or not sensible to the fingers of a reader disposed in Braille reading position upon said wall portion; means to rotate said member about said axis; and means effective to set said indicators of each of said cell groups during rotation of said member in selected combinations of said positions to cause successive ones of said cell groups to form a succession of Braille cells on said wall portion, said setting means being connectable and responsive to input means having said succession of Braille cells pre-encoded therein, a plurality of said cells so formed being sensible at any given time during said rotation to the fingers of a reader disposed as aforesaid on said wall portion.

2. The reader of claim 1 wherein said member comprises a drum and said wall portion the cylindrical wall of said drum, said drum wall defining inner and outer peripheral surfaces, and wherein said indicators comprise pins extending radially through said drum wall and movable therein between positions in which said pins are either flush with or protrude from one of said drum surfaces, said drum wall including means maintaining said pins in either of said positions.

3. The reader of claim 2 wherein said maintaining means includes an insert disposed in said drum wall between said inner and outer surfaces thereof, said pins passing through said insert and being frictionally engaged thereby.

4. The reader of claim 2 wherein said setting means includes first means disposed adjacent said drum wall effective to set all of said pins in each of said cell groups in one of said positions with respect to one of said peripheral surfaces, and second means disposed adjacent said drum wall and spaced from said first means in the direction of rotation of said drum, said second means being effective to move selected ones of said pins in each of said cell groups from said one to the other of said positions with respect to said one surface to form a Braille cell sensible to the fingers of a reader disposed as aforesaid upon said one surface.

5. The reader of claim 4 wherein said pins when in said flush position with respect to one of said surfaces are in said protruding position with respect to the other of said surfaces, and wherein said first means includes a cancelling roller disposed within said drum and engaging said inner peripheral surface, said roller being effective to move all of said pins to said flush position with respect to said inner surface, whereupon said pins are in said protruding position with respect to said outer surface, said second means being disposed adjacent said outer surface and effective to move said pins to said flush position with respect to said outer surface.

6. The reader of claim 5 wherein said second means includes a stationary set of electro-magnetic means effective upon activation to independently move selected ones of said pins of each successive cell group upon passage of each such group thereby during rotation of said drum.

7. The reader of claim 6 including said input means in combination therewith, said input means comprising an incremental tape recorder employing magnetic tape having Braille cells pre-encoded thereon, said recorder having an input circuit effective to control incremental progression of said tape through said recorder and an output circuit, both of said circuits being operatively connected to said reader effective first to cause said tape progression and then to activate said reader electro-magnetic means in response to said successive pre-encoded Braille cells and including control means synchronizing operation of said recorder input and output circuits relative to rotation of said drum.

8. The combination of claim 7 wherein said control means includes timing means operatively associated with said drum rotation, electro-magnetic means and recorder input and output circuits.

9. The combination of claim 8 wherein said control means includes an electro-magnetic control relay responsive to operation of said timing means and effective to activate and deactivate said electro-magnetic means through said recorder output circuit and, respectively, to deactivate and activate said tape progression through said recorder input circuit.

10. The combination of claim 9 wherein said control relay includes alternate switch contacts, one of said contacts being in series with said electro-magnetic means through said recorder output circuit and the other in series with said recorder input circuit.

References Cited

UNITED STATES PATENTS

| 2,521,338 | 9/1950 | Bryce et al. | 35—35.1 |
| 2,981,324 | 6/1959 | Zuk | 35—35.1 |

EUGENE R. CAPOZIO, Primary Examiner

W. H. GRIEB, Assistant Examiner